United States Patent
Kim

(10) Patent No.: US 12,424,087 B2
(45) Date of Patent: Sep. 23, 2025

(54) SYSTEM AND METHOD FOR COLLECTING TRAFFIC INFORMATION

(71) Applicants: Hyundai Motor Company, Seoul (KR); Kia Corporation, Seoul (KR)

(72) Inventor: Han Shik Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 415 days.

(21) Appl. No.: 17/683,837

(22) Filed: Mar. 1, 2022

(65) Prior Publication Data
US 2023/0028094 A1     Jan. 26, 2023

(30) Foreign Application Priority Data

Jul. 22, 2021   (KR) ........................ 10-2021-0096667

(51) Int. Cl.
*G08G 1/01*   (2006.01)
*G01C 21/00*  (2006.01)
*G01S 19/49*  (2010.01)

(52) U.S. Cl.
CPC ....... *G08G 1/0133* (2013.01); *G01C 21/3896* (2020.08); *G01S 19/49* (2013.01); *G08G 1/0112* (2013.01)

(58) Field of Classification Search
CPC .. G08G 1/0133; G08G 1/0112; G08G 1/0141; G08G 1/065; G08G 1/096811; G08G 1/096816; G08G 1/0968; G01C 21/3896; G01C 21/3492; G01C 21/3859; G01C 21/3885; G01C 21/3848; G01S 19/49; G06Q 50/40

See application file for complete search history.

(56) References Cited

U.S. PATENT DOCUMENTS

| | | |
|---|---|---|
| 8,239,133 B2 | 8/2012 | Wang et al. |
| 10,045,206 B2 | 8/2018 | Hania et al. |
| 2004/0104842 A1* | 6/2004 | Drury .............. G08G 1/096827 342/357.31 |
| 2004/0230374 A1* | 11/2004 | Tzamaloukas ......... G01C 21/28 340/988 |

(Continued)

FOREIGN PATENT DOCUMENTS

| | | | |
|---|---|---|---|
| KR | 100888717 B1 | 3/2009 | |
| KR | 20110056955 A * | 5/2011 | ............. G01C 21/34 |

(Continued)

OTHER PUBLICATIONS

Hye Yeon Park, Navigation Apparatus and Method Thereof (Year: 2011) NPL attached.*

*Primary Examiner* — Abby J Flynn
*Assistant Examiner* — Bakari Underwood
(74) *Attorney, Agent, or Firm* — Fox Rothschild LLP

(57) ABSTRACT

A system for collecting traffic information includes a vehicle having at least one sensor for collecting dead reckoning (DR) information, and a global positioning system (GPS) receiver configured to receive GPS information, and a server that maps the DR information and the GPS information to a server map to generate first map matching information, and collects the first map matching information as the traffic information when it is determined that a version of a software platform of the vehicle is a latest version and all the DR information and the GPS information are received.

16 Claims, 7 Drawing Sheets

(56) References Cited

U.S. PATENT DOCUMENTS

| | | | | |
|---|---|---|---|---|
| 2006/0184322 A1* | 8/2006 | Kim | ................... | G01C 21/3694 |
| | | | | 455/414.3 |
| 2007/0294023 A1* | 12/2007 | Arcot | ................... | G08G 1/0104 |
| | | | | 701/117 |
| 2020/0175855 A1 | 6/2020 | Park | | |

FOREIGN PATENT DOCUMENTS

| KR | 2016-0066461 A | 6/2016 |
|---|---|---|
| KR | 101846909 B1 | 4/2018 |
| KR | 2019-0026395 A | 3/2019 |
| KR | 102103834 B1 | 4/2020 |
| KR | 2020-0067055 A | 6/2020 |

\* cited by examiner

SYSTEM AND METHOD FOR COLLECTING TRAFFIC INFORMATION

CROSS-REFERENCE TO RELATED APPLICATION

This application claims under 35 U. S. C. § 119(a) the benefit of Korean Patent Application No. 10-2021-0096667, filed in the Korean Intellectual Property Office on Jul. 22, 2021, the entire contents of which are incorporated herein by reference.

BACKGROUND

(a) Technical Field

The present disclosure relates to a system and method for collecting traffic information, more particularly, to the system and method for collecting traffic information for providing an optimal route to a user by obtaining accurate traffic information.

(b) Description of the Related Art

Recently, for the convenience of users, a technology for providing traffic information in real time has been developed. For example, a server may obtain traffic information in which the GPS information of a terminal (mobile terminal) map-matches the map information of the terminal, or obtain traffic information by using a probe vehicle that provides a connected car service. In addition, the server may provide an optimal route to the vehicle based on the obtained traffic information.

However, when the map information of the terminal is not updated, the GPS information does not match accurate map information, and the server typically obtains traffic information with poor accuracy. In addition, when the number of terminals capable of obtaining traffic information or the number of probe vehicles is small, the server may obtain traffic information with poor accuracy. Therefore, in order to improve the accuracy of traffic information, it is necessary to secure a large number of probe vehicles, but it is difficult to secure a probe vehicle in a short period of time, so a technical alternative capable of acquiring accurate traffic information would be desired.

SUMMARY

An aspect of the present disclosure provides a system and method for collecting traffic information that can provide an optimal route to a user by obtaining accurate traffic information.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for collecting traffic information includes a vehicle including at least one sensor for collecting dead reckoning (DR) information, and a global positioning system (GPS) receiver configured to receive GPS information, and a server that maps the DR information and the GPS information to a server map to generate first map matching information, and collects the first map matching information as the traffic information when it is determined that a version of a software platform of the vehicle is a latest version and all the DR information and the GPS information are received.

The at least one sensor may obtain the DR information for performing dead reckoning.

The vehicle may transmit the DR information and the GPS information to the server when the version of the software platform is the latest version.

The vehicle may map the DR information and the GPS information to a map of a navigation system to generate second map matching information, and transmit the second map matching information to the server when the vehicle determines that the version of the software platform is not the latest version.

The vehicle may map the DR information and the GPS information to the server map to generate third map matching information, and transmit the third map matching information to the server when the vehicle determines that the version of the software platform is not the latest version and software of the navigation system is updated.

The server may determine whether the version of the software platform is the latest version, and receive the second map matching information or the third map matching information when the version of the software platform is not the latest version.

The server may assign a weight to the second map matching information and collect the second map matching information to which the weight is assigned as the traffic information.

The server may collect the third map matching information as the traffic information.

The server may set the weight to be lower as at least one of the first map matching information and the third map matching information increases.

The server may calculate a traffic volume based on the traffic information, and calculate a path to a destination based on the traffic volume.

According to another aspect of the present disclosure, a method of collecting traffic information includes determining, by a server, a version of a software platform of a vehicle that collects dead reckoning (DR) information obtained by at least one sensor and GPS information obtained by a global positioning system (GPS) receiver, determining, by the server, whether all of the DR information and the GPS information are received, mapping the DR information and the GPS information to a server map to generate first map matching information when it is determined that a version of the software platform of the vehicle is a latest version and all the DR information and the GPS information are received, and collecting the first map matching information as the traffic information.

The method may further include transmitting the DR information and the GPS information collected by the vehicle to the server when the version of the software platform is the latest version.

The method may further include mapping, by the vehicle, the DR information and the GPS information to a map of a navigation system to generate second map matching information when the version of the software platform is not the latest version, and transmitting the second map matching information to the server.

The method may further include determining, by the vehicle, whether software of the navigation system is updated when the vehicle determines that the version of the software platform is not the latest version.

The method may further include mapping the DR information and the GPS information to the server map to generate third map matching information when the vehicle determines that the software of the navigation system of the vehicle is updated, and transmitting the third map matching information to the server.

The method may further include receiving, by the server, the second map matching information or the third map matching information when the version of the software platform of the vehicle is not the latest version.

The method may further include assigning, by the server, a weight to the second map matching information and collecting the second map matching information to which the weight is assigned as the traffic information.

The method may further include collecting, by the server, the third map matching information as the traffic information.

The server may set the weight to be lower as at least one of the first map matching information and the third map matching information increases.

The method may further include calculating, by the server, a traffic volume based on the traffic information when the traffic information is collected, and calculating a path to a destination based on the traffic volume.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
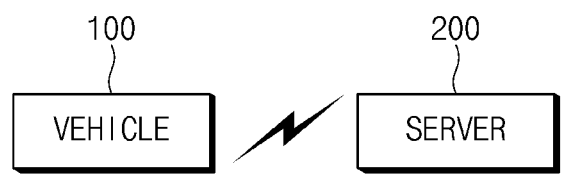
FIG. 1 is a block diagram showing the configuration of a system for collection traffic information according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram showing the configuration of a system for collection traffic information according to an embodiment of the present disclosure.

As shown in FIG. 1, a system for collecting traffic information 300 according to an embodiment of the present disclosure may include a vehicle 100 and a server 200.

The vehicle 100 may collect dead reckoning (DR) information obtained by at least one sensor and GPS information obtained by a GPS receiver, and may transmit the collected information to the server 200. The details will be described with reference to FIG. 3.

When the version of a software platform of the vehicle 100 is the latest version, and both DR information and GPS information are received, the server 200 may map-match the DR information and GPS information to a server map to generate first map matching information, and may collect the first map matching information as traffic information. The details will be described with reference to FIG. 4.

Figure 2:
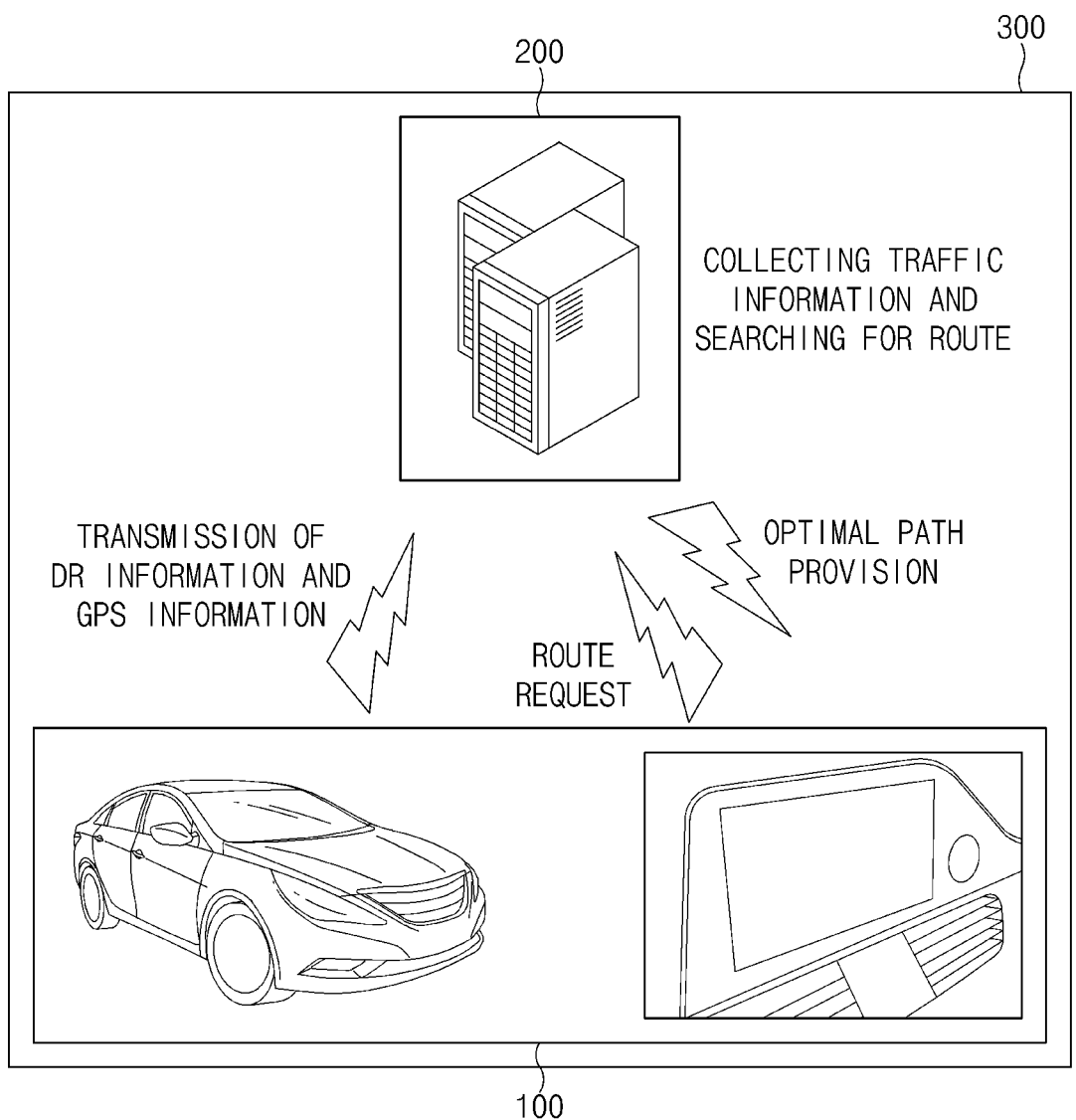
FIG. 2 is a diagram schematically illustrating a system for collecting traffic information according to an embodiment of the present disclosure.

FIG. 2 is a diagram schematically illustrating a system for collecting traffic information according to an embodiment of the present disclosure.

As shown in FIG. 2, the vehicle 100 may transmit the collected DR information and GPS information to the server 200, and the server 200 may collect the traffic information based on the DR information and GPS information received from the vehicle 100. When the vehicle 100 requests a route to a destination, the server 200 may search for an optimal route to the destination based on the collected traffic information. The server 200 may transmit the optimal route to the vehicle 100 when the optimal route to the destination is found. The detailed embodiments will be described with reference to FIGS. 3 and 4.

Figure 3:
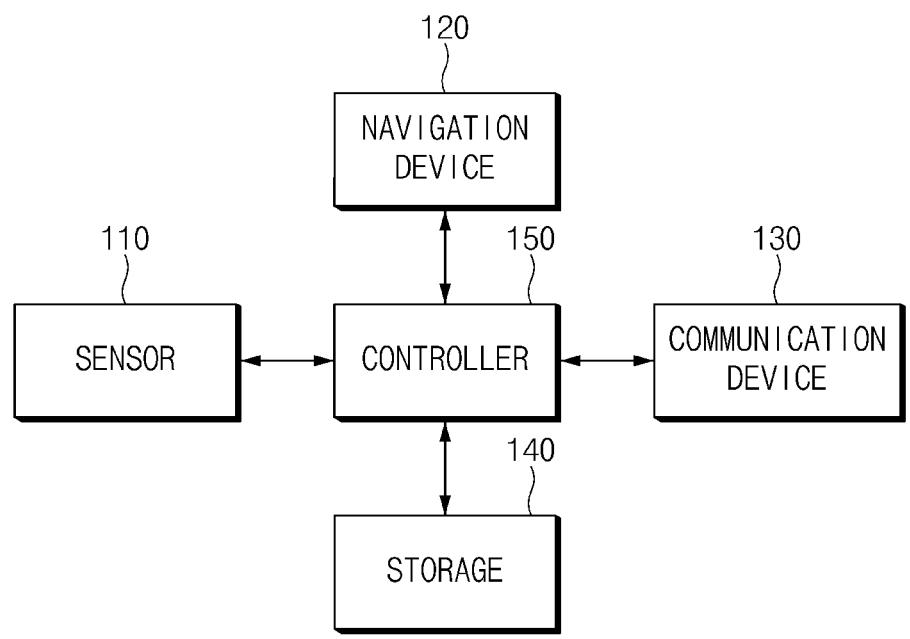
FIG. 3 is a block diagram illustrating the configuration of a vehicle according to an embodiment of the present disclosure.

FIG. 3 is a block diagram illustrating the configuration of a vehicle according to an embodiment of the present disclosure.

As shown in FIG. 3, the vehicle 100 according to an embodiment of the present disclosure may include a sensor 110, a navigation device 120, a communication device 130, storage 140, and a controller 150.

The sensor 110 may obtain dead reckoning (DR) information for performing dead reckoning. In this case, dead reckoning refers to the movement of a vehicle being predicted based on the moving speed and the moving direction of the vehicle based on a starting location to estimate the location. Accordingly, the DR information may include information necessary for estimating the location of the vehicle. According to an embodiment, the DR information may include vehicle speed, acceleration, and geomagnetic information, and in order to obtain them, the sensor 110 may include a speed sensor, a gyro sensor, and a geomagnetic sensor.

The navigation device 120 may provide the user with information on a specific area, for example, the area around the user in the form of a map, text, or various symbols, or may provide the user with a route from one location to another and guide the route. In addition, the navigation device 120 may include a GPS receiver to receive GPS information (current location of the vehicle) of the vehicle from a plurality of global positioning system satellites. In addition, the navigation device 120 may guide information on a certain area based on the current location of the vehicle, and may provide the optimal route to a destination received from the server 200 through audio or video.

The communication device 130 may transmit the DR information obtained by the sensor 110 and the GPS information obtained by the GPS receiver provided in the navigation device 120 to the server 200. According to an embodiment, the communication device 130 may communicate with the server 200 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 140 may store at least one algorithm for performing calculation or execution of various commands for the operation of the vehicle according to an embodiment of the present disclosure. The storage 140 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 150 may be implemented with various processing devices such as a microprocessor in which a semiconductor chip capable of performing calculation or execution of various commands is embedded, and the like, and may control the operation of the vehicle according to an embodiment of the present disclosure.

The controller 150 may collect the dead reckoning (DR) information obtained by at least one sensor 110 and the GPS information obtained by the GPS receiver. The controller 150 may determine an environment (operating system) in which at least one algorithm stored in the storage 140 is executed, that is, a version of a software platform, and may determine whether the version of the software platform is the latest version.

When it is determined that the version of the software platform is the latest version, the controller 150 may control the collected DR information and GPS information to be transmitted to the server 200.

However, when it is determined that the version of the software platform is not the latest version, the controller 150 may map-match the DR information and the GPS information to a map pre-stored in the navigation device 120 to generate the second map matching information. In addition, the controller 150 may control the second map matching information to be transmitted to the server 200.

In addition, when it is determined that the version of the software platform is not the latest version, the controller 150 may update the software of the navigation device 120 to receive the server map. Accordingly, when the navigation software is updated, the controller 150 may receive the server map from the server and update the map pre-stored in the navigation device to the server map. In this case, the server map may include a map in which information on a new road, information on a changed road, or information on whether construction is being performed is reflected in real time.

The controller 150 may generate third map matching information by map-matching the DR information and the GPS information to the server map. In addition, the controller 150 may control the third map matching information to be transmitted to the server 200.

Figure 4:
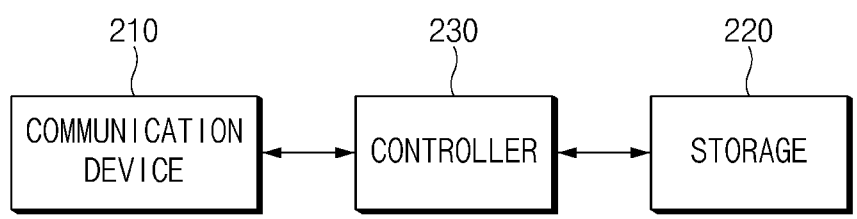
FIG. 4 is a block diagram illustrating the configuration of a server according to an embodiment of the present disclosure.

FIG. 4 is a block diagram illustrating the configuration of a server according to an embodiment of the present disclosure.

As shown in FIG. 4, the server 200 may include a communication device 210, storage 220, and a controller 230.

The communication device 210 may receive the DR information and GPS information from the vehicle 100, and may transmit the optimal route to a destination to the vehicle 100. According to an embodiment, the communication device 210 may communicate with the server 200 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 220 may store at least one algorithm for performing calculation or execution of various commands for the operation of the server according to an embodiment of the present disclosure. The storage 220 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 230 may be implemented with various processing devices such as a microprocessor in which a semiconductor chip capable of performing calculation or execution of various commands is embedded, and the like, and may control the operation of the server according to an embodiment of the present disclosure.

The controller 230 may determine whether the version of the software platform of the vehicle 100 is the latest version. When it is determined that the version of the software platform of the vehicle 100 is the latest version, the controller 230 may determine whether both the DR information and the GPS information are received from the vehicle 100.

When the controller 230 determines that both the DR information and the GPS information have been received from the vehicle 100, the controller 230 may determine that the information has been normally received from the vehicle 100, and match the received DR information and GPS information to generate the first map matching information. When the first map matching information is generated, the controller 230 may collect the first map matching information as traffic information.

Meanwhile, when only one of the DR information and the GPS information is received, the controller 230 may determine that it is not normally received, and in this case, may delete the information received from the vehicle 100.

When it is determined that the version of the software platform of the vehicle 100 is not the latest version, the controller 230 may receive the second map matching information or the third map matching information generated from the vehicle 100. When the second map matching information is received, the controller 230 may assign a weight to the second map matching information and collect it as traffic information. When the third map matching information is received, the controller 230 may collect the third map matching information as traffic information.

The controller 230 sets the weight assigned to the second map matching information because the map pre-stored in the navigation device where the DR information and the GPS information are matched does not reflect information that changes in real time, such as a server map. Thus, because the reliability of information is relatively lowered, a weight is set to reflect the lowered reliability. Accordingly, according to an embodiment, the controller 230 may set the initial value of the weight to 0.9.

In addition, in case where, as the number of vehicles with the latest version of the software platform increases, the DR information and GPS information received from the vehicles with the latest version of the software platform are matched to the server map so that the first map matching information increases, or the navigation software of the vehicle is updated so that the third map matching information generated in the vehicle increases, the controller 230 may set the weight to be lower than the initial value.

When at least one of the first map matching information, the second map matching information, and the third map matching information is collected as traffic information, the controller 230 may calculate an amount of traffic based on the traffic information.

The controller 230 may calculate an optimal route to the destination based on the amount of traffic, and when receiving a request to provide the optimal route to the destination from the vehicle 100, the controller 230 may transmit the calculated optimal route to the vehicle 100.

Figure 5:
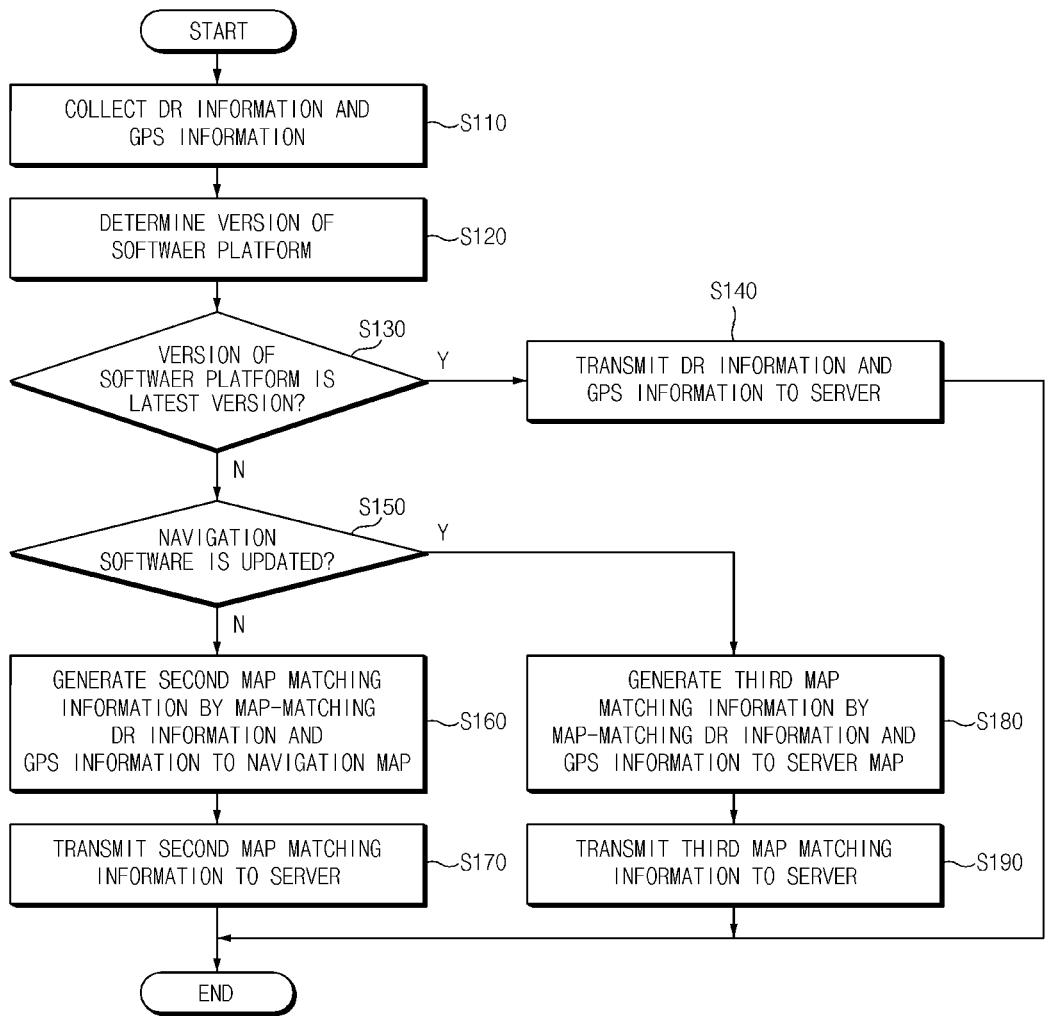
FIG. 5 is a flowchart illustrating an operation of a vehicle according to an embodiment of the present disclosure.

FIG. 5 is a flowchart illustrating an operation of a vehicle according to an embodiment of the present disclosure.

As shown in FIG. 5, in S110, the vehicle 100 may collect the DR information obtained by the at least one sensor 110 and the GPS information obtained by the GPS receiver.

In S120, the vehicle 100 may determine the environment (operating system) in which at least one algorithm stored in the storage 140 is executed, that is, the version of the software platform, and determine whether the version of the software platform is the latest version.

In S130, the vehicle 100 may determine whether the version of the software platform is the latest version. When it is determined in S130 that the version of the software platform is the latest version (Y), in S140, the vehicle 100 may control the collected DR information and GPS information to be transmitted to the server 200.

When it is determined in S130 that the version of the software platform is not the latest version (N), in S150, the vehicle 100 may determine whether the navigation (120 in FIG. 3) software is updated. When it is determined in S150 that the navigation software is updated, the vehicle 100 may receive the server map from the server and update the map pre-stored in the navigation device to the server map. The server map may include a map in which information on a new road, information on a changed road, or information on whether construction is performed is reflected in real time.

When it is determined in S150 that the navigation software is not updated (N), in S160, the vehicle 100 may map-match the DR information and the GPS information to the map pre-stored in the navigation device to generate the second map matching information. In addition, in S170, the controller 150 may transmit the second map matching information to the server 200.

Meanwhile, when it is determined in S150 that the navigation software is updated (Y), in S180, the vehicle 100 may map-match the DR information and GPS information to the server map to generate the third map matching information. In addition, in S190, the vehicle 100 may transmit the third map matching information to the server 200.

Figure 6:
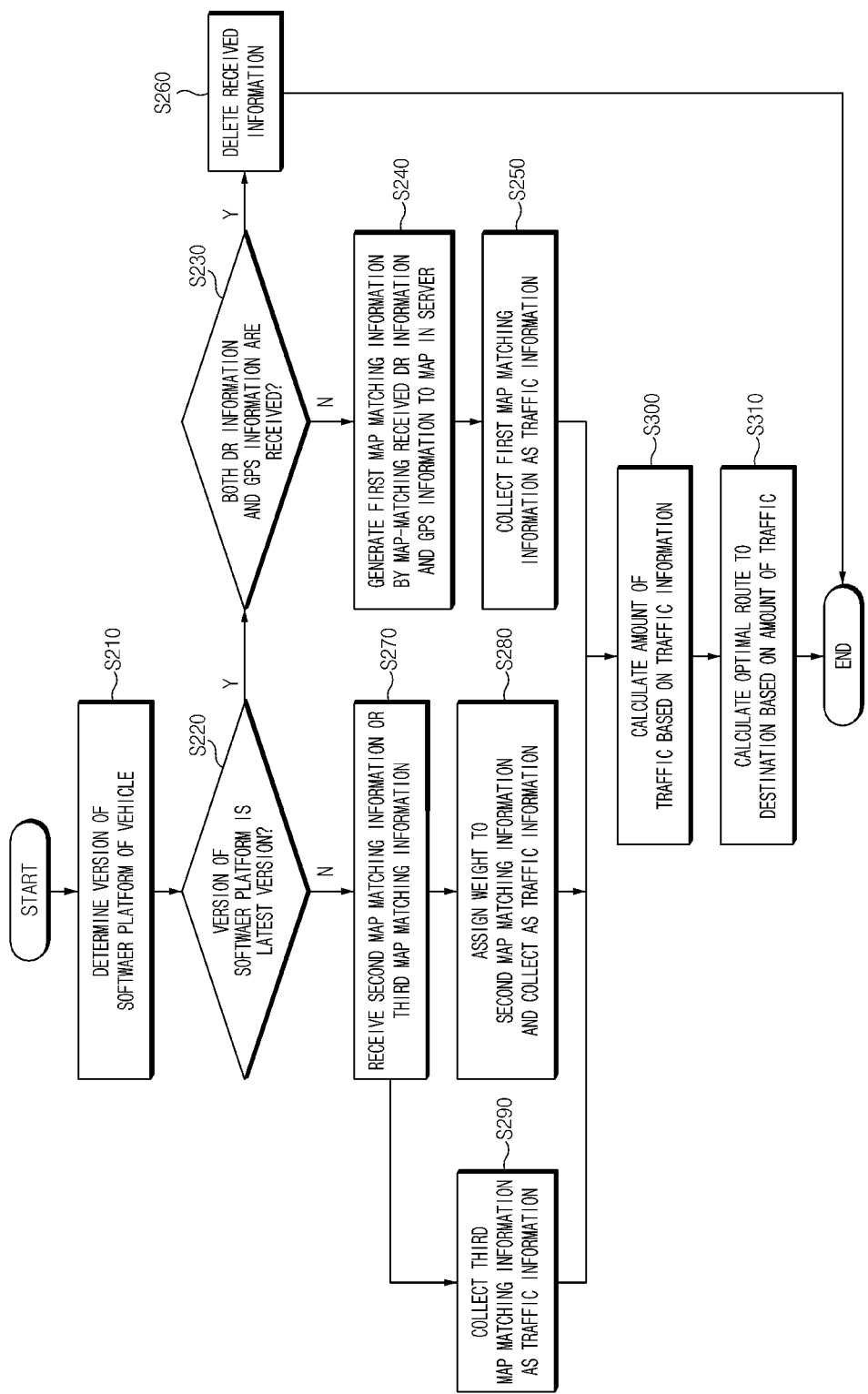
FIG. 6 is a flowchart illustrating a method of collecting traffic information according to an embodiment of the present disclosure.

FIG. 6 is a flowchart illustrating a method of collecting traffic information according to an embodiment of the present disclosure.

As shown in FIG. 6, in S210, the server 200 may determine whether the version of the software platform of the vehicle 100 is the latest version.

When it is determined in S210 that the version of the software platform of the vehicle 100 is the latest version (Y), in S230, the server 200 may determine whether all of the DR information and the GPS information are received from the vehicle 100.

When it is determined in S230 that all of the DR information and the GPS information are received from the vehicle 100 (Y), in S240, the server 200 may determine that the information is normally received from the vehicle 100, and may match the received DR information and GPS information to the map in the server to generate the first map matching information. When the first map matching information is generated, in S250, the server 200 may collect the first map matching information as traffic information.

Meanwhile, the server 200 may determine that the DR information and the GPS information are not normally received when only one of the DR information and the GPS information is received. In this case, in S260, the server 200 may delete the information received from the vehicle 100.

When it is determined in S220 that the version of the software platform of the vehicle 100 is not the latest version (N), in S270, the server 200 may receive the second map matching information or the third map matching information generated from the vehicle 100.

When the second map matching information is received from the vehicle 100, in S280, the server 200 may assign a weight to the second map matching information and collect the second map matching information to which the weight is assigned as traffic information. The server 200 sets the weight assigned to the second map matching information because the map pre-stored in the navigation device where the DR information and the GPS information are matched does not reflect information that changes in real time, such as a server map. Thus, because the reliability of information is relatively lowered, a weight is set to reflect the lowered reliability. Accordingly, according to an embodiment, the controller 230 may set the initial value of the weight to 0.9.

In addition, in case where, as the number of vehicles with the latest version of the software platform increases, the DR information and GPS information received from the vehicles with the latest version of the software platform are matched to the server map so that the first map matching information increases, or the navigation software of the vehicle is updated so that the third map matching information generated in the vehicle increases, the server 200 may set the weight to be lower than the initial value.

In S290, when the third map matching information is received from the vehicle 100, the server 200 may collect the third map matching information as traffic information.

In S300, when at least one of the first map matching information, the second map matching information, and the third map matching information is collected as traffic information, the server 200 may calculate an amount of traffic based on the traffic information.

In S310, the server 200 may calculate an optimal route to the destination based on the amount of traffic. Although not shown, when receiving a request to provide an optimal route to the destination from the vehicle 100, the server 200 may transmit the calculated optimal route to the vehicle 100.

Figure 7:
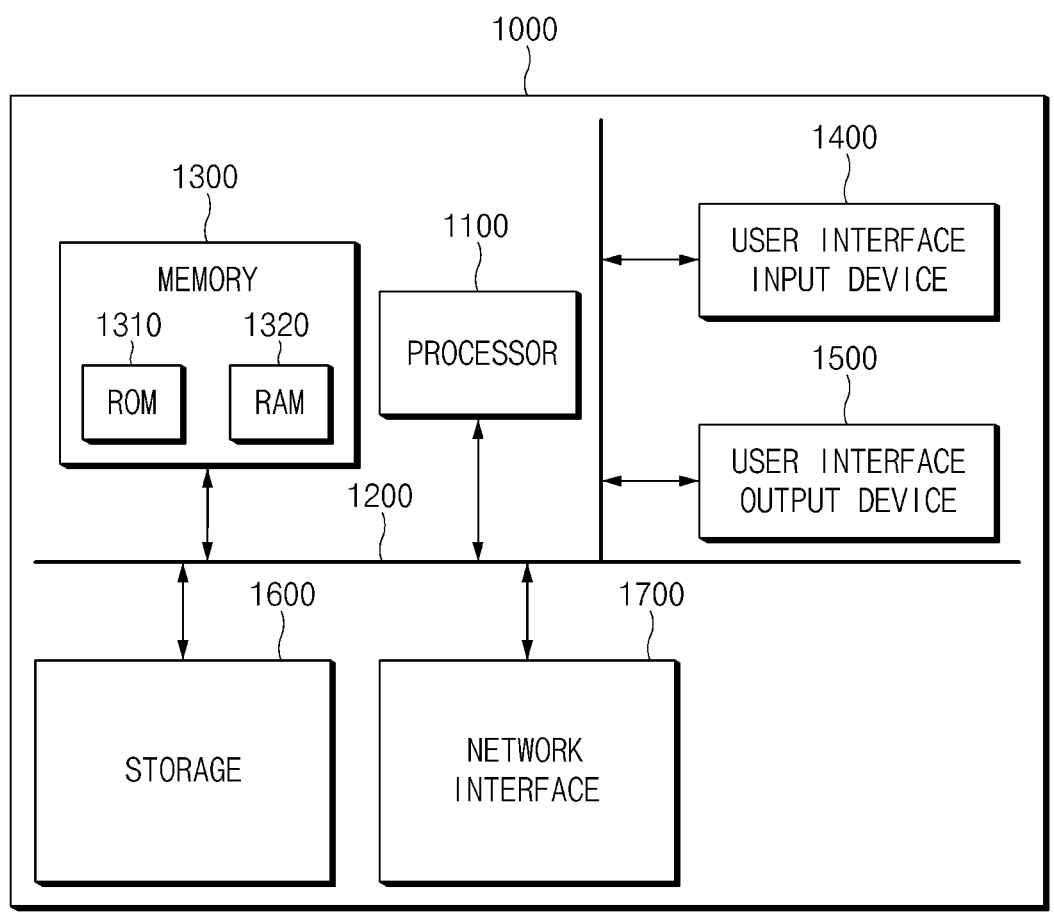
FIG. 7 is a block diagram illustrating a computing system for executing a method according to an embodiment of the present disclosure.

FIG. 7 is a block diagram illustrating a computing system for executing a method according to an embodiment of the present disclosure.

Referring to FIG. 7, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The system and method for collecting traffic information according to the embodiments of the present disclosure may provide an optimal route to a user by obtaining accurate traffic information.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for collecting traffic information, the system comprising:
    a vehicle including at least one sensor for collecting dead reckoning (DR) information, and a navigation system including a global positioning system (GPS) receiver configured to receive GPS information;
    a server in communication with the navigation system and configured to:
        determine whether a version of a software platform of the navigation system of the vehicle is a latest version;
        when it is determined that a version of a software platform of the vehicle is the latest version, determine whether all DR information and GPS information are received; and
        when it is determined that all the DR information and the GPS information are received,
            map the DR information and the GPS information to a server map to generate first map matching information; and
            collect the first map matching information as the traffic information; and
    the vehicle configured to:
        when the vehicle determines that the version of the software platform is not the latest version,
            map the DR information and the GPS information to a map of the navigation system of the vehicle to generate second map matching information; and
            transmit the second map matching information to the server;
    wherein the server is further configured to, in response to receipt of the second map matching information;
        assign a weight to the second map matching information; and
        collect the second map matching information to which the weight is assigned as the traffic information;
        wherein the weight is set to reflect lower reliability of the second map matching information compared to the first map matching information;

calculate path to the destination based on the traffic information; and transmit the path to the destination to the navigation system; and wherein the navigation system is further configured to output the received path to the destination.

2. The system of claim 1, wherein the at least one sensor is configured to obtain the DR information for performing dead reckoning.

3. The system of claim 1, wherein the vehicle is configured to transmit the DR information and the GPS information to the server when the version of the software platform is the latest version.

4. The system of claim 1, wherein the vehicle is further configured to:

map the DR information and the GPS information to the server map to generate third map matching information, and transmit the third map matching information to the server when the vehicle determines that the version of the software platform is not the latest version and the software platform is subsequently updated to the latest version.

5. The system of claim 4, wherein the server is further configured to:

determine whether the version of the software platform is the latest version, and receive the second map matching information or the third map matching information when the version of the software platform is not the latest version.

6. The system of claim 5, wherein the server is configured to collect the third map matching information as the traffic information.

7. The system of claim 5, wherein the server is configured to set the weight to be lower as at least one of the first map matching information and the third map matching information increases.

8. The system of claim 1, wherein the server is configured to calculate a traffic volume based on the traffic information, and calculate the path to the destination based on the traffic volume.

9. A method of collecting traffic information, the method comprising:

determining, by a server, a version of a software platform of a vehicle that collects dead reckoning (DR) information obtained by at least one sensor and GPS information obtained by a global positioning system (GPS) receiver of a navigation system;

determining by the server, whether a version of a software platform of the navigation system of the vehicle is a latest version;

determining, by the server, whether all of the DR information and the GPS information are received;

when the server determines that the version of the software platform is the latest version and all the DR information and the GPS information received;

mapping, by the server, the DR information and the GPS information to a server map to generate first map matching information; and collecting, by the server, the first map matching information as the traffic information;

determining, by the vehicle, whether the version of a software platform is the latest version;

when the vehicle determine bat the version of the software platform is not the latest version, mapping, by the vehicle, the DR information and the GPS information to a map of the navigation system of the vehicle to generate second map matching information, transmitting the second map matching information to the server, assigning by the server, a weight to the second map matching information, and collecting, by the server, the second map matching information to which the weight is assigned as the traffic information;

wherein the weight is set to reflect lower reliability of the second map matching information compared to the first map matching information;

calculating by the server, a path to the destination based on the traffic information; and outputting, by the navigation system, the received path to the destination.

10. The method of claim 9, further comprising:
transmitting the DR information and the GPS information collected by the vehicle to the server when the version of the software platform is the latest version.

11. The method of claim 9, further comprising:
determining, by the vehicle, whether the software platform is updated to the latest version after the vehicle determines that the version of the software platform is not the latest version.

12. The method of claim 11, further comprising:
mapping the DR information and the GPS information to the server map to generate third map matching information when the vehicle determines that the software platform is subsequently updated to the latest version; and transmitting the third map matching information to the server.

13. The method of claim 12, further comprising:
receiving, by the server, the second map matching information or the third map matching information when the version of the software platform is not the latest version.

14. The method of claim 13, further comprising:
collecting, by the server, the third map matching information as the traffic information.

15. The method of claim 9, wherein the server is configured to set the weight to be lower as at least one of the first map matching information and the third map matching information increases.

16. The method of claim 9, further comprising:
calculating, by the server, a traffic volume based on the traffic information when the traffic information is collected; and calculating the path to the destination based on the traffic volume.

* * * * *